United States Patent [19]

Tanaka et al.

[11] Patent Number: 4,734,812
[45] Date of Patent: Mar. 29, 1988

[54] TAPE CARTRIDGE WITH ERASURE-PREVENTING INDICATOR PLUG

[75] Inventors: Kimio Tanaka, Saku; Haruo Shiba, Komoro; Yoshiya Sakata, Saku, all of Japan

[73] Assignee: TDK Corporation, Tokyo, Japan

[21] Appl. No.: 10,592

[22] Filed: Jan. 30, 1987

Related U.S. Application Data

[63] Continuation of Ser. No. 647,336, Sep. 5, 1984, abandoned.

[30] Foreign Application Priority Data

Sep. 9, 1983 [JP] Japan .................... 58-139111

[51] Int. Cl.⁴ .................... G11B 23/02; G11B 15/04; G11B 19/04
[52] U.S. Cl. .................... 360/132; 360/60; 242/199
[58] Field of Search ............... 360/60, 132, 137, 74.5, 360/96.5; 242/191–199

[56] References Cited

U.S. PATENT DOCUMENTS

| | | | |
|---|---|---|---|
| 3,826,489 | 7/1974 | Watkins, Jr. | 360/60 |
| 4,012,011 | 3/1977 | Saito | 360/132 |
| 4,041,537 | 8/1977 | Kishi | 360/132 |
| 4,044,386 | 8/1977 | Satou et al. | 242/198 |
| 4,053,935 | 10/1977 | Shiba | 360/60 |
| 4,320,421 | 3/1982 | Larson et al. | 360/132 |
| 4,399,481 | 8/1983 | Loranger et al. | 360/132 |
| 4,496,999 | 1/1985 | Espin | 360/60 |
| 4,507,692 | 3/1985 | Sasaki | 360/60 |
| 4,530,017 | 7/1985 | Oishi et al. | 360/60 |
| 4,536,812 | 8/1985 | Oishi et al. | 360/60 |

FOREIGN PATENT DOCUMENTS

| | | | |
|---|---|---|---|
| 0045186 | 2/1982 | European Pat. Off. | 360/60 |
| 58-218085 | 12/1983 | Japan | 360/132 |

*Primary Examiner*—Stuart N. Hecker
*Assistant Examiner*—Alfonso Garcia
*Attorney, Agent, or Firm*—Seidel, Gonda, Goldhammer & Abbott

[57] ABSTRACT

In a magnetic tape cartridge having a detection opening which can be opened or closed with a plug to prevent erroneous erasure of recorded signals on the tape, an indication opening through which the plug can be seen from the outside and a slot through which the plug is positioned as desired are both formed in a first wall of the cartridge housing, and the detection opening is formed in a second wall located differently from the first, in such a manner that the indication opening or slot is selectively closed by sliding of the plug from one position to the other or vice versa. The plug includes an elastic lock member in sliding contact with the inner surface of the first wall. The first wall has two grooves such that, when the plug is in either position, the lock member fits in the corresponding one of the two grooves. The plug is L-shaped along the inner surfaces of the first and second walls, and the lock member is disposed in a recess formed within the plug.

3 Claims, 9 Drawing Figures

FIG. 1b
FIG. 1a
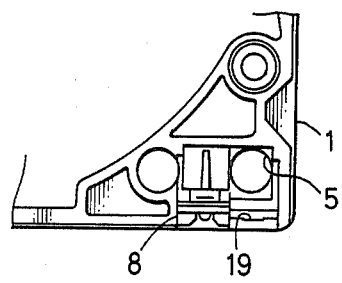
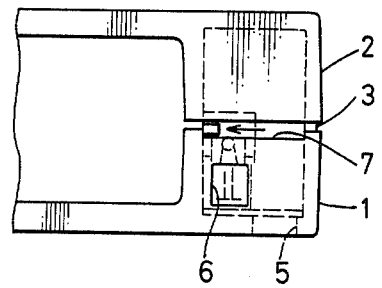
FIG. 2b
FIG. 2a
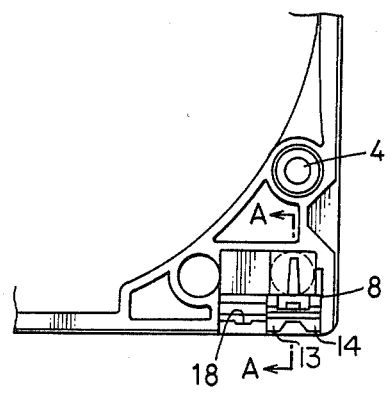
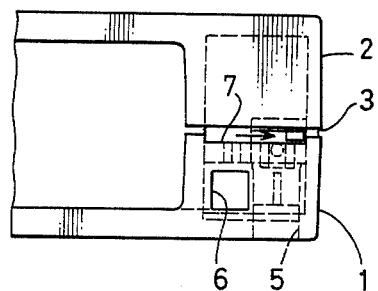
FIG. 3
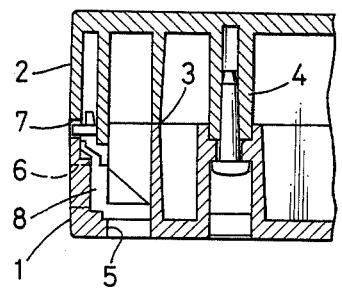

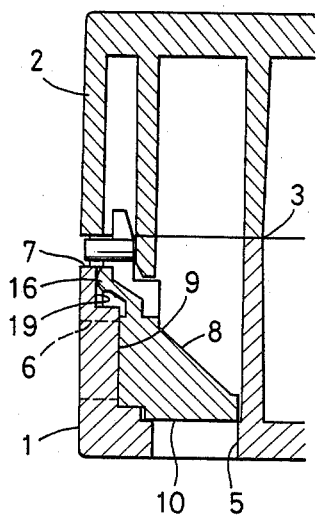
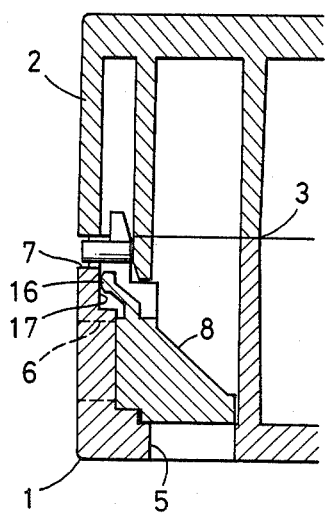
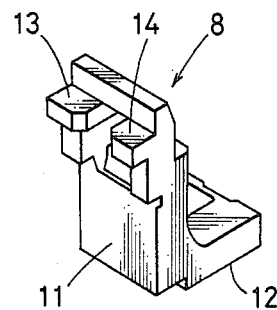
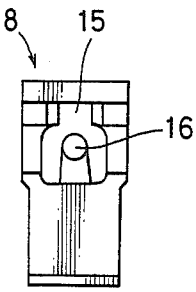

_4,734,812_

TAPE CARTRIDGE WITH ERASURE-PREVENTING INDICATOR PLUG

This application is a continuation of patent application Ser. No. 647,336, filed Sept. 5, 1984 now abandoned.

BACKGROUND OF THE INVENTION

1. Field of the Invention

This invention relates to a magnetic tape cartridge and more particularly to a mechanism for preventing erasure of recorded video or audio signals.

2. Description of the Prior Art

For the prevention of unwanted or erroneous erasure of video or audio signals already recorded on magnetic tapes in cartridges, two different approaches have generally been considered; tab and plug types. The tab in most cases is formed in one piece with the cartridge housing and is adapted to be broken away to defeat further recording. It is used once for all, and for repetitive record-defeating some other means must be employed. The plug is usually not integral with the cartridge housing and has to be attached and removed for its function. Thus, the plug has the advantage of reusability but is inconvenient to handle; it must be fitted for each service with the necessity of subsequent removal and, moreover, the plug can sometimes be lost to view. Such a plug-type mechanism for preventing erasure of recorded video or audio signals, with which the present invention is concerned, depends on the plug position for opening or closing a detection opening to receive the detection feeler of the tape recorder (to prevent rerecording of video or audio signals) or keep off the feeder (for video or audio recording). With the cartridges of the prior art, however, the plug position is not readily observable from the outside; in order to make sure of the plug position inside it is necessary to peep through the detection opening.

BRIEF SUMMARY OF THE INVENTION

Accordingly, it is an object of this invention to provide a mechanism for preventing erasure of video or audio signals recorded on the magnetic tape in a cartridge, which has no possibility of the plug dropping out of the cartridge housing.

Another object of the invention is to provide a mechanism of the character defined above which additionally permits the position of the plug to be readily seen from the outside.

The magnetic tape cartridge according to the present invention includes a slide plug of a given color different from that of the cartridge housing, fitted to the interior of the rear walls of the upper and lower housing sections mated together. The bottom wall of the housing is formed with a detection opening through which the detection feeler of a tape recorder can move into and out of the housing to detect whether or not the tape inside has been recorded with video (and/or audio) signals. The housing also has in its rear wall an indication opening through which the user can confirm whether or not the tape inside has already been recorded and a plug-handling slot through which the user can move the slide plug. The plug, detection opening, and indication opening are interrelated so that the plug in either of two alternative positions can selectively close either of the two openings. In the structure described, the slide plug closing the detection opening does not show the plug color through the indication opening, telling that the tape inside is unrecorded yet. After the recording, the user slides the plug through the slot to the other position, whereby the detection opening is opened and the indication opening gives the plug color, this time indicating that the tape has already been recorded.

The present invention, according to which the indication opening is formed in the rear wall of the cartridge, offers the advantage of ready confirmation of whether or not the cartridge contains a recorded tape. As the user grips the cartridge by the rear wall portion and inserts it frontwardly into the cartridge-loading opening of the tape recorder, the rear wall enables the viewer to see immediately if the slide plug is exposed through the indication opening. Also, because the detection and indication openings are both formed in the same rear wall of the housing, the user can easily make certain that the slide plug has functioned properly. Further, because the detection and indication openings are separately formed in the two different rear planes of the housing, the two corresponding surfaces of the plug can be utilized. These features make it possible to use a small size plug and hence reduce the overall dimensions of the cartridge.

BRIEF DESCRIPTION OF THE DRAWINGS

FIGS. 1(a) and (b) are back and plan views, respectively, of a rear corner of a magnetic tape cartridge embodying the invention, (b) showing the interior with the upper housing section removed;

FIGS. 2(a) and (b) are views similar to FIGS. 1(a) and (b) except that the plug is in the other alternative position;

FIG. 3 is a sectional view taken on the line A—A and as seen in the direction of the arrows in FIG. 2(b);

FIG. 4 is an enlarged, fragmentary sectional view of the corner in FIG. 3;

FIG. 5 is an enlarged sectional view similar to FIG. 4 but with the plug at an intermediate location;

FIG. 6 is a perspective view of the plug; and

FIG. 7 is a front view of the plug.

DESCRIPTION OF THE PREFERRED EMBODIMENT

Referring now to FIGS. 1 and 2, lower and upper housing sections 1, 2 which form peripheral walls of the cartridge too are joined along mating edges 3 and secured together by appropriate setscrews 4. [Refer to FIG. 3, a sectional view taken on the line A—A of FIG. 2(b).] The bottom wall of the lower housing section 1 is formed with a detection opening 5 in a portion to face a detection feeler not shown which is to protrude from the tape recorder into the opening to make certain that the tape inside the cartridge is already recorded. In the back wall of the lower housing section is formed an indication opening 6 spaced horizontally from the detection opening 5 and which permits the user to see if the tape has been recorded or not. Also, a plug-handling slot 7 is horizontally formed in a portion of the mating peripheries of the upper and lower housing sections to expose the control lugs of a slide plug. As FIGS. 4 and 5 show on an enlarged scale, the lower housing section has guide faces 9, 10 formed on the interior of a rear corner so that they can guide the slide plug 8 horizontally. The indication opening 6 extends through a portion of the guide face 9 of the rear wall, and the detection opening 5 through a portion of the guide face 10.

Throughout FIGS. 4 to 7, the slide plug 8 is shown as a generally L-shaped molded piece of plastics having an upright part 11 and a base part 12 to be slidably supported, respectively, by the guide faces 9, 10. It can slide along the interior of the rear wall of the housing. The plug in one extreme position closes the indication opening 6 with its upright part 11 and in the other extreme position closes the detection opening 5 with its base part 12. The upright part 11 has two lugs 13, 14 projecting frontwardly (as viewed from the back of the housing) from its upper portion for the convenience of moving the plug sideways. These lugs 13, 14 are exposed to the slot 7 in the mating peripheries of the housing sections so that they can be moved together from the outside. As can be seen from FIGS. 4, 5 and 7, the slide plug has a recess 15 in the upper, central portion into which a lock member 16 projects. The lock member 16 is built to be deflected elastically. FIGS. 4 and 5 show it elastically in sliding contact with the interior 17 of the rear wall of the lower housing section. When the plug is in either extreme position, the lock member 16 fits, according to its position, in a groove 18 or 19 [FIGS. 1(b), 2(b), and 4]formed in the interior of the rear wall, so as to perform a lock or detent function.

The use of the magnetic tape cartridge according to the invention will now be explained. The cartridge is marketed with the slide plug 8 in the right hand position (FIG. 2) where it closes the detection opening 5 in the bottom wall but leaves the indication opening 6 open. Viewing through the indication opening 6 in this state, the user can immediately know that the tape is unrecorded (with video and/or audio signals) or ready for video recording since the colored plug 8 is not visible through the opening. When the user does not want rerecording after the video recording, he has only to insert the tip of a slender rodlike piece or ball-pointed pen into the gap between the lugs 13, 14 of the plug 8 through the slot 7 and thereby move the plug to the left hand position. The plug 8 then is displaced from the detection opening 5, admitting the detection feeler of the tape recorder into the opening (to defeat further recording) and closing the indication opening 6 of the rear wall so that the plug color visible through the opening indicates that the video recording is over. At this point the lock member 16 fits in the groove 19 for the locking purpose. When rerecording of video signals is desired, the plug 8 is reset to the right hand position with the lock member 16 this time fitted in the groove 18.

As described above, the magnetic tape cartridge of the present invention uses a sliding plug permanent in life and simple to handle for record defeating and resetting for rerecording. Provision of the plug-handling slot and the indication opening in different walls of the cartridge housing renders possible the use of a smaller plug, and hence a more compact cartridge, than heretofore. Moreover, because the indication opening formed in the rear wall is easy to inspect and the slot is formed on the same planar surface as the indication opening, the plug function or position can be confirmed with ease.

What is claimed is:

1. A magnetic tape cartridge having first and second housing sections, one of said housing sections comprising first and second walls mating at a right angle, a first discrete opening formed in said first wall, a second discrete opening formed in said second wall, a discrete slot formed in said second wall and spaced from said second opening, and a plug having first and second walls and mounted within said cartridge so as to slide on said first and second walls at said one section in the longitudinal direction of said slot between first and second positions, said plug being provided with a portion projecting into said slot so as to be accessible from the exterior of said cartridge, and means for releasably locking said plug in said first and second positions, said first and second openings being spaced apart such that either said first wall of said plug blocks said first opening and said second wall of said plug clears said second opening or said first wall of said plug clears said first opening and said second wall of said plug blocks said second opening depending on whether said plug is in said first or second position, whereby the opening blocked by a plug wall provides an indication of the recordable status of said cartridge.

2. A magnetic tape cartridge have first and second housing sections, one of said housing sections comprising first and second walls mating at a right angle, a first discrete opening formed in said first wall, a second discrete opening formed in said second wall, a discrete slot formed in said second wall and spaced from said second opening, said second wall having formed therein first and second spaced grooves, and a plug having first and second walls and mounted within said cartridge so as to slide on said first and second walls of said one section in the longitudinal direction of said slot between said first and second grooves, said plug being provided with a portion projecting into said slot so as to be accessible from the exterior of said cartridge, and said plug having an elastically deflectable lock member for releasably locking said plug at either of said first and second grooves, said first and second openings being spaced apart such that either said first wall of said plug blocks said first opening and said second wall of said plug clears said second opening or said first wall of said plug clears said first opening and said second wall of said plug blocks said second opening depending on whether said plus is locked at said first or second groove, whereby the opening blocked by a plug provides an indication of the recordable status of said cartridge.

3. A magnetic tape cartridge having first and second housing sections, one of said housing sections comprising first and second walls mating at a right angle, a first discrete opening formed in said first wall, a second discrete opening formed in said second wall, a discrete slot formed in said second wall and spaced from said second opening, and a plug having first and second walls and mounted within said cartridge so as to slide on said first and second walls of said one section in the longitudinal direction of said slot between first and second positions, means for releasably locking said plug at said first and second positions, said plug being provided with a portion including a pair of spaced lugs projecting into said slot so as to be accessible from the exterior of said cartridge, said first and second openings being spaced apart such that either said first wall of said plug blocks said first opening and said second wall of said plug clears said second opening or said first wall of said plug clears said first opening and said second wall of said plug blocks said second opening depending on whether said plug is locked at said first or second position, whereby the opening blocked by a plug wall provides an indication of the recordable status of said cartridge.

* * * * *